United States Patent

Michel et al.

[11] Patent Number: 5,459,726
[45] Date of Patent: Oct. 17, 1995

[54] DEVICE FOR THE INITIATION OF MULTIPLEX TIMINGS IN AN ASYNCHRONOUS SWITCHING SYSTEM

[75] Inventors: Michel Servel; Pierre Boyer, Lannion; Didier Tranchier, Pleumeur-Bodou, all of France

[73] Assignee: France Telecom, France

[21] Appl. No.: 217,214

[22] Filed: Mar. 21, 1994

Related U.S. Application Data

[63] Continuation of Ser. No. 841,728, Feb. 26, 1992, abandoned.

[30] Foreign Application Priority Data

Mar. 13, 1991 [FR] France .................................. 91 03284

[51] Int. Cl.$^6$ .................................................. H04L 12/56
[52] U.S. Cl. ........................................... 370/60; 370/60.1
[58] Field of Search ..................... 370/94.1, 60, 60.1, 370/94.2, 110.1, 79, 58.1–58.3

[56] References Cited

U.S. PATENT DOCUMENTS 4,603,416  7/1986  Servel et al. ......................... 370/94.1
4,884,264  11/1989  Servel et al. ............................ 370/60
4,905,225  2/1990  Francois et al. .......................... 370/60
4,933,932  6/1990  Quinquis et al. ......................... 370/60
4,995,032  2/1991  Demichelis et al. ..................... 370/60
5,067,123  11/1991  Hyodo et al. .......................... 370/94.1
5,233,601  8/1993  Boyer et al. ............................. 370/60
5,237,564  8/1993  Lespagnol et al. ..................... 370/60.1

*Primary Examiner*—Douglas W. Olms
*Assistant Examiner*—Chau T. Nguyen
*Attorney, Agent, or Firm*—Laff, Whitesel, Conte & Saret, Ltd.

[57] ABSTRACT

A device for initiating multiple timings has a supply of clock pulses. At each clock pulse, an entering cell is stored in a communication system with asynchronous time switching. The stored cell belongs to a virtual communication circuit that carries a number in the label of the cell. A random access, read-write timing memory (MT) has a plurality of addressable zones which normally store null or inactive bits. The memory (MT) is alternately addressed for writing and for reading. The memory (MT) comprises a data input (ED) to store, in a zone addressed for writing, a parameter bound to a characteristic of a virtual circuit. A data output (SD) delivers the content of the memory zone addressed during reading.

9 Claims, 1 Drawing Sheet

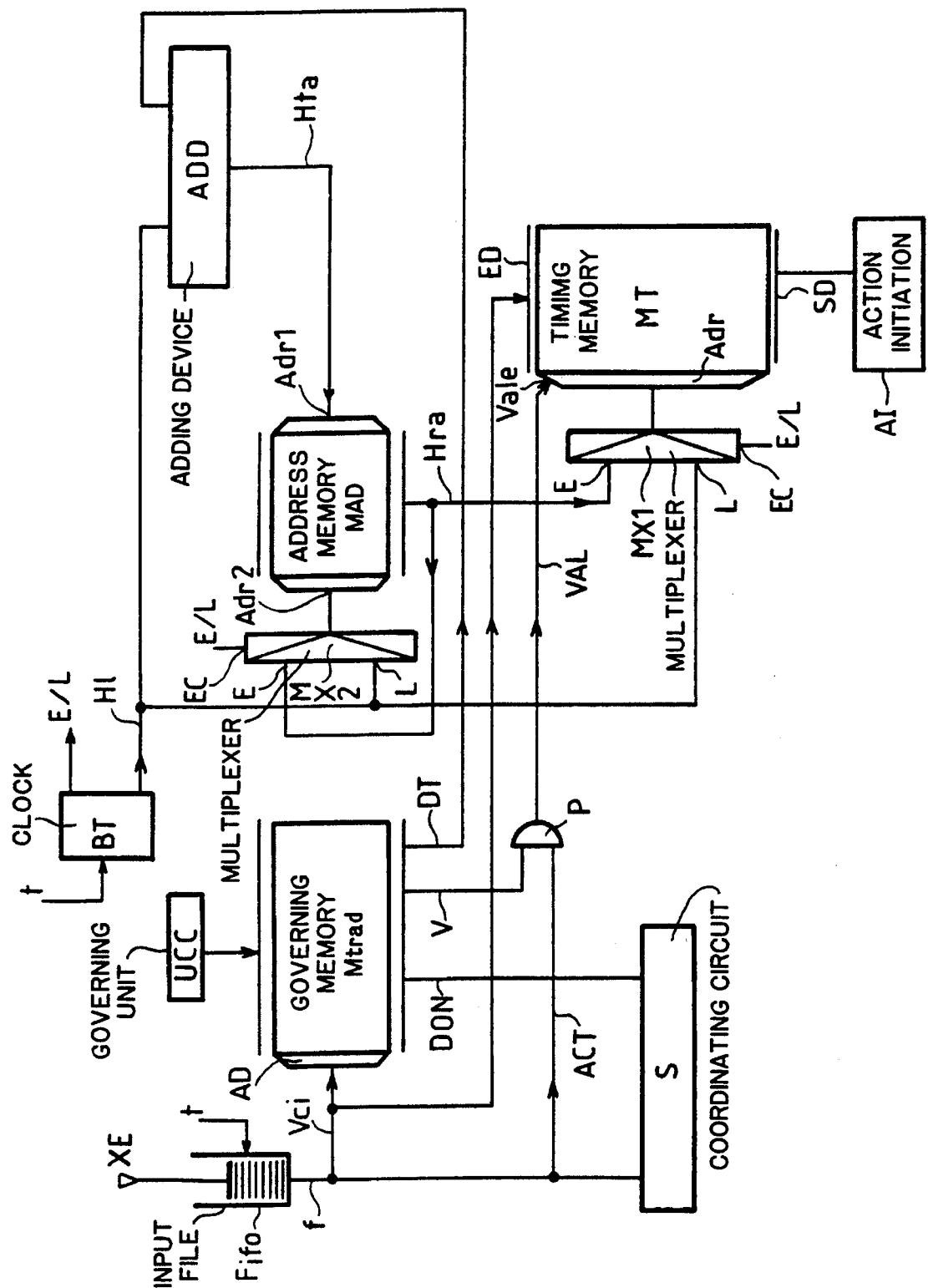

DEVICE FOR THE INITIATION OF MULTIPLEX TIMINGS IN AN ASYNCHRONOUS SWITCHING SYSTEM

This application is a continuation of application Ser. No. 07/841,728, filed Feb. 26, 1992, now abandoned.

The present invention relates to a device for the initiation of multiple timings, to be used in an asynchronous time switching communication system in order to initiate, at the arrival of a cell at the input of that timing device, a timing process the duration of which is bound to a characteristic of the entering cell, and in order to initiate, at the end of that timing duration, an action bound to a second characteristic of the cell that has initiated the timing process.

Such a timing device may find numerous applications, especially during the execution of certain protocols of communication by cells.

A timing process may be executed by means of a counter the count of which is initialized at the arrival of an event and that count of which is decremented at each clock pulse of elementary duration. In order simultaneously to execute several processes, there must be available as many counters as their are processes to be treated. It is easy to understand that for a high number of timing processes, several thousand for example, the number of counters to be used becomes a drawback.

Another solution consists in using a memory with several zones that can be addressed, in which there are respectively stored the durations of the different timings. For each elementary time of a clock, the content of each zone is decremented and a given action is initiated when that content becomes null. For a high number of timing processes, the time spent in decrementing each zone of the memory becomes too important. Besides, it is not easy to bind the action initiated at the end of a given timing to the process that did initiate it.

The purpose of the present invention is to offset these drawbacks, and to supply a device that makes it possible to initiate a high number of timing processes simultaneously, without the time spent in managing the whole of these processes being too high. The purpose of the present invention also is to provide a device in which the action initiated at the end of a timing is bound to the process that has initiated it.

To that end, a device according to the present invention comprises a timing memory of the read-write memory type, with random access that has a plurality of addressable zones in which there are normally stored null or inactive bytes to indicate an idle condition, that memory comprising an input for data so as to be able to store, into a zones addressed for writing, a parameter bound to a characteristic of the virtual circuit to which the entering cell belongs, that characteristic being present at the time when the entering cell arrives; a data output is able to deliver for reading the content of that memory that has been addressed, said memory being alternately addressed for writing and reading, writing being responsive to a byte delivered to its output by a two-input adding device, one input of which is connected to a time base to receive from it a byte representative of the local time and the other input of which receives a timing duration byte bound to a characteristic of the virtual circuit to which the entering cell belongs, and for reading responsive to that byte that is representative of the local time, the presence of a parameter on the output of said memory having as its result to initiate an action when the presence of an inactive byte initiates no action.

According to another characteristic of the invention, a device determines the available addresses, the device having an input connected to the output of the aforementioned adding device, and an output connected to the addressing input for writing of said timing memory, that device delivering, on its output, an address that is either the same as the address present at its input, or equal to an address that is the closest neighbor of that (previous) address and that is such that it corresponds to an available zone of the timing memory in which no parameter has been stored.

According to another characteristic of the invention the above-mentioned parameter stored in the zone of the memory addressed for writing is the number of the virtual circuit to which said entering cell belongs, and that is contained in the label of that cell.

According to another characteristic of the invention, the byte of timing duration is delivered, at its output, by a governing memory that has as many addressable zones as the number of virtual circuits the communication system is capable of managing, each zone of that memory being addressed for reading by a parameter that is characteristic of the virtual circuit to which belongs the entering cell that is present at its addressing input at that time, so as to be able to deliver, on the output of that memory, the corresponding timing byte.

According to another characteristic of the invention, the mentioned parameter that addresses the indicated governing memory is the number of the virtual circuit to which said entering cell belongs.

According to another characteristic of the invention, that parameter that is stored in the zone addressed for writing in said timing memory is a data stored in a zone of said governing memory at the address corresponding to a given virtual circuit number.

According to another characteristic of the invention, the timing duration byte is loaded, by a driving unit, into a zone of said governing memory the address of which is equal to the number of the corresponding virtual circuit.

According to another characteristic of the invention, the governing memory delivers, on its output, for each addressed zone, an enabling bit that is supplied to a governing input of the timing memory, either to authorize the writing into said timing memory when that bit is active, or to forbid that writing when the bit is inactive.

According to another characteristic of the invention, the label of the entering cell comprises an identification bit that is supplied to an output of the timing memory, either to authorize the writing into that memory when the bit is active, or to forbid that writing when that bit is inactive.

The above-mentioned characteristics of the invention, as well as others, will appear more clearly upon reading of the following description of an example of execution, that description being given with respect to the attached drawing in which the single figure shows a block diagram of an initiation of multiple timings.

The multiple timing initiating device shown in that Figure comprises an intake file FiFo, a translation memory Mtrad, a memory of available addresses MAD, and a timing memory MT.

The FiFo file receives, on its input, a multiplex XE that is, for example an asynchronous timing multiplex, of the type described in the document EP-A-108 208. Each cell delivered by the FiFo file, hereafter called the "entering cell", is synchronous with the local clock t of the system and it is presented on to an array of several wires f sixteen of which carry the sixteen bits of the Vci label that identifies the virtual circuit that is routing that cell forward and, consequently, the communication under consideration. In the array of wires f at the exit of the FiFo file, there is also a wire that carries a cell identification bit ACT that is active for the cells that may initiate a process of given timing.

The Mtrad memory is a read-write memory of the type with random access that has as many addressable zones as there are different communications which the system is capable of treating. A memory of that type, as well as its operation have been described, for example in document FR-A-2 538 976 under reference MC. The Mtrad memory receives, on its addressing input AD, the label Vci of the entering cell. At each communication and therefore for each virtual circuit that is brought into play, there corresponds an addressable zone of the Mtrad memory. Each addressable zone contains different data regarding, for example, the ulterior routing of the cells. These data are supplied to the Mtrad memory by a governing unit UCC.

Among these data there has been provided, for each addressable zone of the Mtrad memory, an enabling bit V that serves, as it will be seen later, to comfirm or to prevent the initiation of the timing operation by the cells that belong to the virtual circuit corresponding to that zone, as well as byte Dt representative of the duration of that timing. Each bit V and each byte Dt is also supplied to the Mtrad memory by the governing unit UCC.

For the virtual circuits in which no cell is to initiate the timing operation, the enabling bit V is rendered inactive and the byte Dt is, for example, equal to the byte null.

The Mtrad memory also supplies, on its output and for each Vci label that addresses it, DON data relative to the corresponding virtual circuit. These DON data as well as the bits carried by the wire array f are supplied by a system S that may be, for example, a time switching system, such as the one that is described in the document FR-A-2 538 976.

A logical gate P of the AND type respectively receives on its two inputs, for one part the wire carrying the identification bit ACT of the cells involved in the timing operation and, for the other part, the enabling bit V. It delivers, at the output VAL, a bit that is active when the two bits ACT and V are simultaneously active.

A time base BT driven by a clock signal t of the system delivers a byte H1 representative of the local time. At each elementary time of the clock signal t, the byte H1 is incremented by one unit. Thus, for each new entering cell sent by the FiFo file, there corresponds a new value of H1 byte.

The time base Bt also initiates a two level signal E/L the period of which is that of the clock signal t.

An adding device ADD has a first input connected to the time base BT to receive there the byte H1, and a second input connected to the output of the Mtrad memory to receive there the timing duration byte DT to which the virtual circuit of the entering cell is allocated. It delivers, on its output, a byte Hta representative of the local time H1 to which is added the timing duration Dt. It will be seen below that the Hta byte is representative of the theoretical time at which the end of the timing process was to take place having been initiated by the entering cell at time H1.

The timing memory MT is a read-write memory of the type with random access, the addressable zones of which normally contain a null or inactive byte. When an addressable zone of the memory MT contains such a byte, that zone is said to be available for the writing of a datum. The MT memory comprises a data input ED connected to the output of the FiFo file to receive there the label Vci of the entering cell. It comprises an addressing input Adr that is connected to the output of a multiplexer MX1 a first input L of which is connected to the time base BT to receive there the byte H1 and a second input E of which is connected to the output of the MAD memory in order to receive there a byte Hra described below. The multiplexer MX1 further comprises a governing input EC that is driven by the E/L signal initiated by the time base BT. When the E/L signal is active, the multiplexer MX1 delivers, on the addressing input Adr of the MT timing memory, the Hra byte issued from the address memory MAD. While when memory MAD is inactive, it delivers the byte H1 issued from the time base BT.

The MT timing memory also comprises a data output SD to deliver the content of the zone addressed for reading.

When the MT timing memory is addressed for reading, the content of the corresponding block is transferred onto the output SD and it is re-initialized to a null or inactive value.

The MT timing memory further comprises a writing enabling input Vale that is connected to the output of the gate AND and that thus receives the enabling bit VAL. When that zone is activated, the writing of the label Vci in the zone of the MT timing memory that is addressed by the output of the multiplexer MX1 can be executed, while that operation is inhibited when same is not activated.

The MAD memory is a read-write memory with random access that comprises as many boxes as does memory MT, each box having a one bit capacity and corresponding in a one-to-one manner to an addressable zone of the MT memory. The address memory MAD has available a first input Adr1 to which is connected the output of adding device ADD, a second input Adr2 to which there is connected the output of a multiplexer MX1 to supply the Hra byte to. The MX2 multiplexer has a first input E that is connected to the output of the MAD memory, and a second input L that is connected to the output of the time base BT to receive there the local clock byte H1. It has, available, a governing input driven by the E/L signal of the time base BT. When that input is activated, the output signal of the MAD memory is found again on the input Adr2 while when it is inactive, it is the byte HI that is found on the Adr2 input.

The MAD memory explores one by one its own boxes and does that, starting from the Hta byte present on its Adr1 input, and it delivers, on its output, a byte Hra that gives the address of a zone of the MT memory to which there corresponds the first inactive box found during the above exploration. At that time, the multiplexer MX2 has its input governed by the active E/L signal and then it supplies the Hra byte to the Adr2 input of the MAD memory. The MAD memory activates the corresponding box, thus showing the occupancy of the zone of the MT memory at that address.

When the E/L signal becomes inactive, the multiplexer MX2 delivers the byte H1 to the input Adr2 of the MAD memory, this having as its result to deactivate the corresponding box of the MAD memory. Let us note that this operation takes place at the reading of the zone of the MT memory that is addressed by the same byte H1, that reading rendering that zone available.

Generally speaking, the first inactive box found by the exploration of the MAD memory corresponds to an address equal to or slightly higher than the Hta byte on the addressing input Adr1, so that the MAD memory delivers, on its output, an Hra address that is not very different from the Hta address. This is more true as the number of addressable zones of the MT memory is (more) important. The functioning of the multiple timing initiation device is as follows:

At a time t, a cell is delivered to the output of the FiFo file, its label addresses the Mtrad memory and the latter then delivers on its output the enabling bit V, the timing duration byte Dt and the DON data relative to the virtual circuit to which that cell belongs. The DON data do not serve the device according to the present invention, and they will not be described.

The timing byte Dt is supplied to an input of the adding device ADD, in which its value is added to the value of the H1 byte representative of the local time. At its output, the adding device then delivers a byte Hta that is representative of the theoretical time at which a certain process should be performed, after expiration of the corresponding timing. The Hta byte is supplied to the Adr1 input of the MAD memory.

Let us assume that the box of the MAD memory that is thus addressed by the Hta byte is inactive, that is to say that the zone of the MT memory that corresponds to that address is available. The Hra byte at the output of the MAD memory then corresponds to the byte Hta.

The Hra byte is present at the input E of the multiplexer MX1. In a first phase, the signal E/L is active, so that the Hra byte addresses the MT memory for a writing operation. At the same time, the Hra byte is present on the Adr2 input of the MAD memory in order to activate the corresponding box and to indicate the occupation of the MT memory zone the address of which is equal to Hra.

The writing operation in the MT memory is possible only when the enabling bit Vale is active, that is to say when the bit V issued from the Mtrad memory and the identification bit ACT of the entering cell are simultaneously active. When such is the case, the label of the entering cell, that corresponds to the identification of the virtual circuit to which it belongs, is stored in the zone of memory MT the address of which corresponds to the Hra byte. That address corresponds, in fact, to the real time at which will occur the expiration of the timing process initiated by the entering cell.

The MAD memory makes it possible to avoid that the numbers of two virtual circuits might be stored at the same address of the MT memory. In case one number of the virtual circuit has already been stored in the MT memory, at the Hta address computed by adding device ADD, the MAD memory determines the available Hra address that is closest to that computed Hta address and it delivers that address on its output as the Hra byte. The process of writing in the MT memory then is similar to the one described above.

Then, in a second phase, the E/L signal governing the multiplexers MX1 and MX2 becomes inactive. The byte H1 then addresses the MT memory for reading and the latter delivers, on its SD output, either a virtual circuit number that has previously been stored, or a null or inactive byte. Moreover, the box addressed for reading is loaded with a null or an inactive byte. The presence, on the SD output of the MT memory, of the number of a Vci virtual circuit has as a result to initiate a process the mechanism of which is not described here as it is not a part of the present invention. Let us nevertheless specify that the action of that process may be bound to the number of the virtual circuit stored in the MT memory.

When the MT memory delivers a null or inactive byte, no action is initiated.

The fact of rendering null or inactive the box that has been addressed for reading prevents that a same process might be initiated a second time in the following cycle of the MT memory.

During that phase, the H1 byte is located at the Adr1 input of the MAD memory in order to deactivate the box corresponding to that address.

The byte H1 then is incremented by one unit by the time base BT. A new entering cell is sent by the FiFo file and a new cycle such as the one that has just been described can start again.

There has been described a device for initiating multiple timings, in which the input of the timing memory receives the number of the virtual circuit to which the entering cell belongs. In fact, in the MT memory, it is also possible to store a datum such as the DON datum, previously stored in the Mtrad memory at an address that corresponds to a virtual circuit number. In that way, it is possible to store into the timing memory MT any parameter bound to a characteristic of the virtual circuit to which the existing cell belongs.

We claim:

1. A device for an initiation of multiple timings for use in asynchronous time switching communication systems, said device comprising a local clock (BT) for delivering synchronously with a local clock pulse (A) a byte (H1) which is representative of time that is local to said device, first memory means (FIFO) for receiving and forwarding a cell synchronously with said local clock pulse (A), said entering cell belonging to a virtual circuit of the communication system and comprising a label in which is stored the number of that virtual circuit, a read-write random access timing memory (MT), said timing memory (MT) having a plurality of addressable zones which normally store inactive bytes, said timing memory (MT), comprising a data input (ED), for storing a parameter associated with said virtual circuit in a memory zone addressed for writing, a data output (SD) for delivering the stored parameter when said timing memory is addressed for reading, an adding circuit (ADD) having two inputs, means for alternately addressing said timing memory (MT) for writing in response to a byte (Hta, Hra) delivered by said adding circuit (ADD), when one of said inputs of said adding circuit is connected to said local clock (BT) for receiving said byte (H1) and the other of said inputs receives a timing duration byte (DT) associated with the virtual circuit to which the cell belongs, and for reading in response to said byte (H1), means responsive to the presence of said parameter on output (SD) of said timing memory (MT) for initiating an action whereas the presence of an inactive byte initiates a non action.

2. A device according to claim 1, further comprising a memory device (MAD) for determining the availability of the memory zones of the timing memory (MT), the memory device (MAD) having an input (Adr1) connected to the output of said adding circuit (ADD) and an output connected to the addressing input of the timing memory (MT) for writing into said timing memory (MT), said memory device (MAD) delivering, on its output, an address (Hra) equal to an address closest to the byte (Hta) delivered by the adding circuit (ADD) and corresponding to a memory zone of timing memory (MT) in which no parameter has been stored.

3. A device according to claim 1 or 2, characterized in that said parameter is the number of said virtual circuit.

4. A device according to claim 1 or 2 further comprising a governing memory (Mtrad) for delivering a timing duration byte (DT) when addressed for reading said parameters having a number of addressable zones that corresponds to a number of virtual circuits that the communication system can manage.

5. A device according to claim 4, wherein said parameter is the number of said virtual circuit.

6. A device according to claim 4 wherein said parameter stored in the memory zone of the timing memory (MT) that is addressed for writing, is a datum stored in an addressable zone of said governing memory (Mtrad) at an address that corresponds to a given virtual circuit.

7. A device according to claim 4, wherein the timing duration byte (Dt) is loaded, by a governing unit (UCC) into an addressable zone of said governing memory (Mtrad) the address of which is equal to the number of the virtual circuit.

8. A device according to claim 4 wherein the governing memory (Mtrad) delivers, on its output and for each addressable zone, an enabling bit (V) that is supplied to a governing input (Vale) of the timing memory (MT), either to authorize the writing into said timing memory (MT) in response to an active byte, or to forbid that writing in response to an inactive byte.

9. A device according to claim 4, wherein the label (Vci) of the cell comprises an identification bit (ACT) that is supplied to an input (Vale) of the timing memory (MT), either to authorize the writing into that memory (MT) in response to an active bit, or to forbid that writing in response to an inactive bit.

* * * * *